United States Patent
Garbo

(10) Patent No.: US 10,399,430 B2
(45) Date of Patent: Sep. 3, 2019

(54) TRANSMISSION SYSTEM FOR HYBRID PROPULSION VEHICLES

(71) Applicant: CARRARO DRIVE TECH S.P.A., Campodarsego (IT)

(72) Inventor: Francesco Garbo, Albignasego (IT)

(73) Assignee: CARRARO DRIVE TECH S.P.A., Campodarsego (PD) (IT)

( * ) Notice: Subject to any disclaimer, the term of this patent is extended or adjusted under 35 U.S.C. 154(b) by 319 days.

(21) Appl. No.: 15/522,617

(22) PCT Filed: Oct. 30, 2015

(86) PCT No.: PCT/EP2015/075226
§ 371 (c)(1),
(2) Date: Apr. 27, 2017

(87) PCT Pub. No.: WO2016/066787
PCT Pub. Date: May 6, 2016

(65) Prior Publication Data
US 2017/0320385 A1    Nov. 9, 2017

(30) Foreign Application Priority Data
Oct. 30, 2014  (IT) .............................. PD2014A0289

(51) Int. Cl.
*B60K 6/48* (2007.10)
*B60K 6/547* (2007.10)
(Continued)

(52) U.S. Cl.
CPC .................. *B60K 6/48* (2013.01); *B60K 6/36* (2013.01); *B60K 6/547* (2013.01); *B60K 17/28* (2013.01);
(Continued)

(58) Field of Classification Search
CPC .. B60K 6/48; B60K 6/547; B60K 2006/4825; F16H 3/091; F16H 41/02; F16H 47/06
(Continued)

(56) References Cited

U.S. PATENT DOCUMENTS 8,534,399 B2 *  9/2013  Soliman .................... B60K 6/48
                                                  180/65.21
8,671,801 B2 *  3/2014  Oki ........................ B60K 6/383
                                                     74/661

(Continued)

FOREIGN PATENT DOCUMENTS

DE        102012013248 A1    1/2014

OTHER PUBLICATIONS

English language abstract for DE 102012013248 A1 (2014).
International Search Report from corresponding PCT/EP2015/075226 dated Dec. 8, 2015.

Primary Examiner — Ha Dinh Ho
(74) Attorney, Agent, or Firm — Caesar Rivise, PC

(57) ABSTRACT

A transmission system for hybrid propulsion vehicles comprises a torque convertor, an external output shaft of the torque convertor which is rigidly connected to the output of the convertor and an internal output shaft which is rigidly connected to the input of the convertor, a gearbox which can be selectively connected to drive wheels of the vehicle, a main coupling member for selectively transmitting the movement of the external shaft to the gearbox, an electric motor which can be selectively operated as a motor and as an electrical generator. The transmission system further comprises a downstream coupling member and an upstream coupling member which are arranged upstream and downstream of the torque convertor, respectively, and which are capable of selectively connecting the rotor element to the external shaft and the internal shaft, respectively. The electric motor further comprises a rotor element which is
(Continued)

arranged at an opposite distal end of the external shaft with respect to the torque convertor, with the main coupling member being arranged in an intermediate position between the torque convertor and the distal end.

4 Claims, 4 Drawing Sheets

(51) Int. Cl.
    *F16H 3/091*     (2006.01)
    *F16H 41/02*     (2006.01)
    *F16H 47/06*     (2006.01)
    *B60K 6/36*     (2007.10)
    *B60K 17/28*     (2006.01)

(52) U.S. Cl.
    CPC .............. *F16H 3/091* (2013.01); *F16H 41/02* (2013.01); *F16H 47/06* (2013.01); *B60K 2006/4825* (2013.01); *B60Y 2200/92* (2013.01); *Y10S 903/909* (2013.01); *Y10S 903/919* (2013.01)

(58) Field of Classification Search
    USPC .......................................................... 74/661
    See application file for complete search history.

(56) References Cited

U.S. PATENT DOCUMENTS

| | | | | |
|---|---|---|---|---|
| 8,974,345 | B2* | 3/2015 | Dourra | ............ F16H 61/061 |
| | | | | 475/281 |
| 9,199,638 | B2* | 12/2015 | Tabata | .............. B60K 6/442 |
| 9,205,832 | B2* | 12/2015 | Tsutsumi | ............. B60W 20/40 |
| 9,493,062 | B2* | 11/2016 | Okuda | ................ B60K 6/365 |
| 2002/0061803 | A1* | 5/2002 | Aoki | ................... B60K 6/44 |
| | | | | 477/3 |
| 2005/0284674 | A1 | 12/2005 | Menne et al. | |
| 2009/0018716 | A1 | 1/2009 | Ambrosio | |

* cited by examiner

TRANSMISSION SYSTEM FOR HYBRID PROPULSION VEHICLES

CROSS-REFERENCE TO RELATED APPLICATIONS

This application is the U.S. National Phase Application of PCT/EP2015/075226, filed Oct. 30, 2015, which claims priority from IT PD2014A000289, filed Oct. 30, 2014, the contents of which applications are incorporated herein by reference in their entireties for all purposes.

BACKGROUND OF THE INVENTION

The present invention relates to a transmission system for hybrid traction vehicles, in particular of the industrial and agricultural type, of the type comprising a torque convertor and an electric motor which can be selectively actuated as a motor and as a generator.

Recently, in the field of industrial and agricultural vehicles, there has also become widespread the use of hybrid propulsion systems in which a non-reversible endothermic motor, generally an internal combustion engine, is associated with a reversible motor, of the electrical type, which can operate both as a motor and as a generator.

Typically, industrial vehicles use a torque converter which is actuated by the endothermic motor which transmits the movement to the wheels by means of a gearbox. More specifically, the endothermic motor is connected to the pump of the torque converter while the transmission portion associated with the wheels is connected to the turbine.

The endothermic motor is further connected to a power take-off, referred to as the PTO, which allows power to be supplied to auxiliary accessories of the vehicle, such as, for example, agricultural equipment or a pump for actuating auxiliary hydraulic devices.

The need to provide for the use of the above-mentioned components makes it all the more complex to define the most suitable architecture to be used in the hybrid systems for industrial vehicles.

Furthermore, it must be taken into consideration that the characteristics of use of industrial vehicles are highly discontinuous and variable, with driving steps alternating with static operating steps, unlike road vehicles which have curves of use of the motor which are well codified.

Consequently, the solutions which use the electrical propulsion in series with the endothermic motor and which are widely used in road vehicles are also not found to be suitable for hybrid industrial vehicles because in this case it would be necessary to have a complete re-design of the transmission which is not justified by the numbers, which are currently generally still relatively modest, of hybrid industrial vehicles.

As an alternative to series type solutions, the patent application US 2009/0018716 discloses a hybrid vehicle which comprises an internal combustion engine which is connected by means of a driven wheel transmission, a power take-off (PTO) which is connected to the transmission and which is capable of supplying power to an accessory device, a hybrid traction system which is connected in parallel to the power take-off and which comprises an electric motor, an energy accumulation system and a system for monitoring and controlling the vehicle. The connection between the transmission and the hybrid traction system is constructed by connecting the electric motor to the force take-off by means of a shaft so as to produce a bi-directional flow of power.

In this manner, when acceleration is brought about, the system operates in such a mode as to provide electrical energy in order to supply power to the transmission, supplementing the motive power provided by the internal combustion engine, while in a deceleration step the electric motor acts as a generator in order to supply a regenerative braking in order to recharge an energy accumulation system.

In addition, the system may operate in a mode in which power is not provided for the wheels and in which the power take-off is disconnected from the transmission and the energy is supplied by the electric motor to the accessory device.

Although the parallel configuration described in that patent application does not require a complete re-design of the transmission with respect to the series type solutions, being suitable for retro-fitting of existing transmissions, it is not found to be optimal from the point of view of the efficiency and the spatial requirement.

Therefore, the technical problem addressed by the present invention is to provide a transmission for vehicles which allows the disadvantages mentioned above with reference to the prior art to be overcome.

That problem is solved by the transmission system according to the invention.

SUMMARY OF THE INVENTION

The present invention has some relevant advantages. The main advantage involves the fact that the transmission system according to the present invention has a structure similar to the one which can also be used for conventional systems, therefore making it unnecessary to design new architecture. Furthermore, it has minimal structural complexity and a reduced spatial requirement overall in comparison with that of the systems provided only with an endothermic motor. Finally, the transmission system according to the present invention advantageously allows use of the main engine with mean power levels less than the peak power, therefore allowing a downsizing thereof. That feature allows, inter alia, compliance with environmental standards which are less restrictive in terms of emissions.

BRIEF DESCRIPTION OF THE DRAWINGS

Other advantages, features and the methods of use of the present invention will become clear from the following detailed description of some embodiments which are set out by way of non-limiting example. Reference will be made to the Figures of the appended drawings, in which.

DETAILED DESCRIPTION OF PREFERRED EMBODIMENTS

Figure 1:
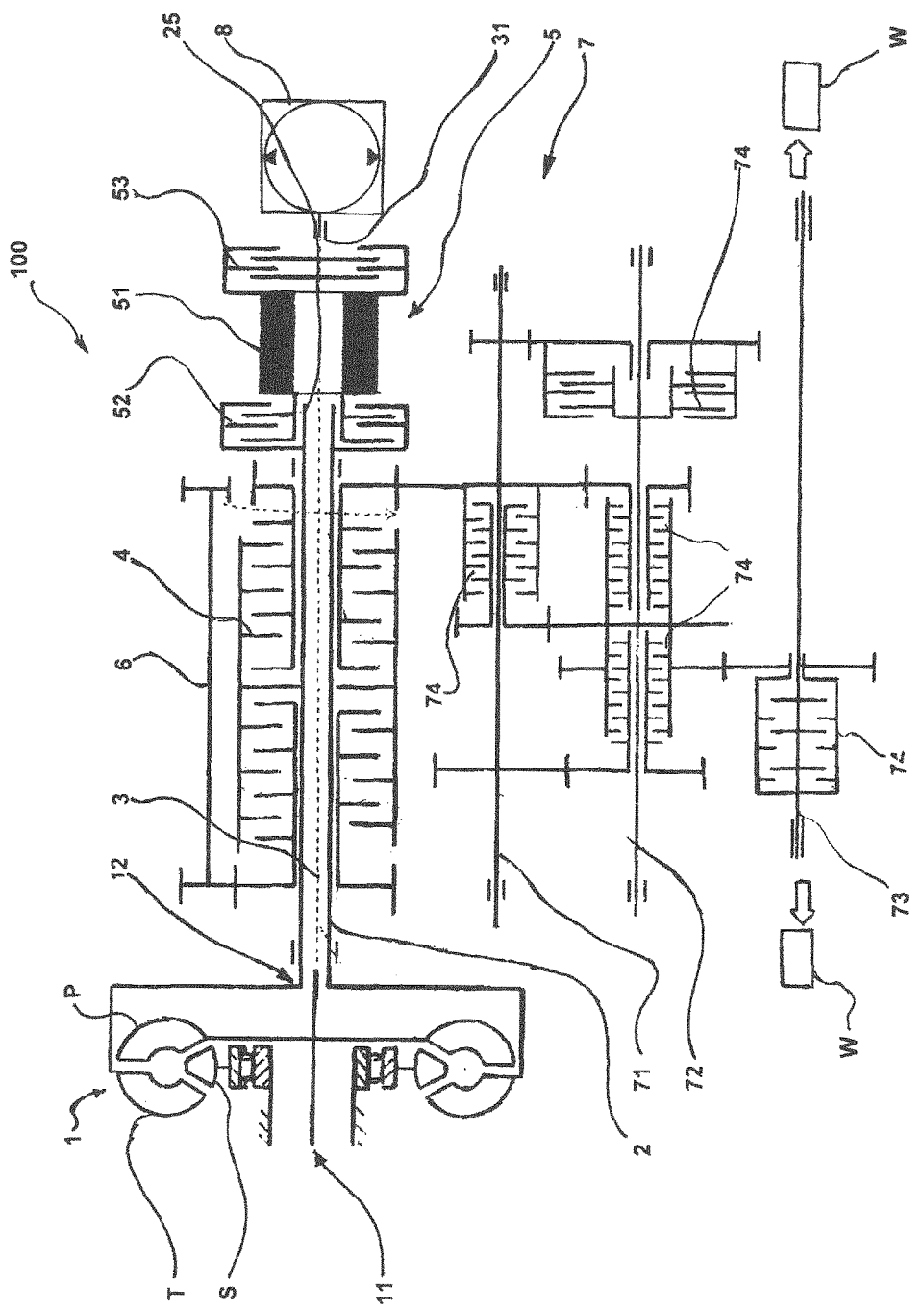
FIG. 1 is a schematic cross-section of a transmission system according to the present invention.

Initially with reference to FIG. 1, a transmission system according to the present invention is generally designated 100.

Figure 2:
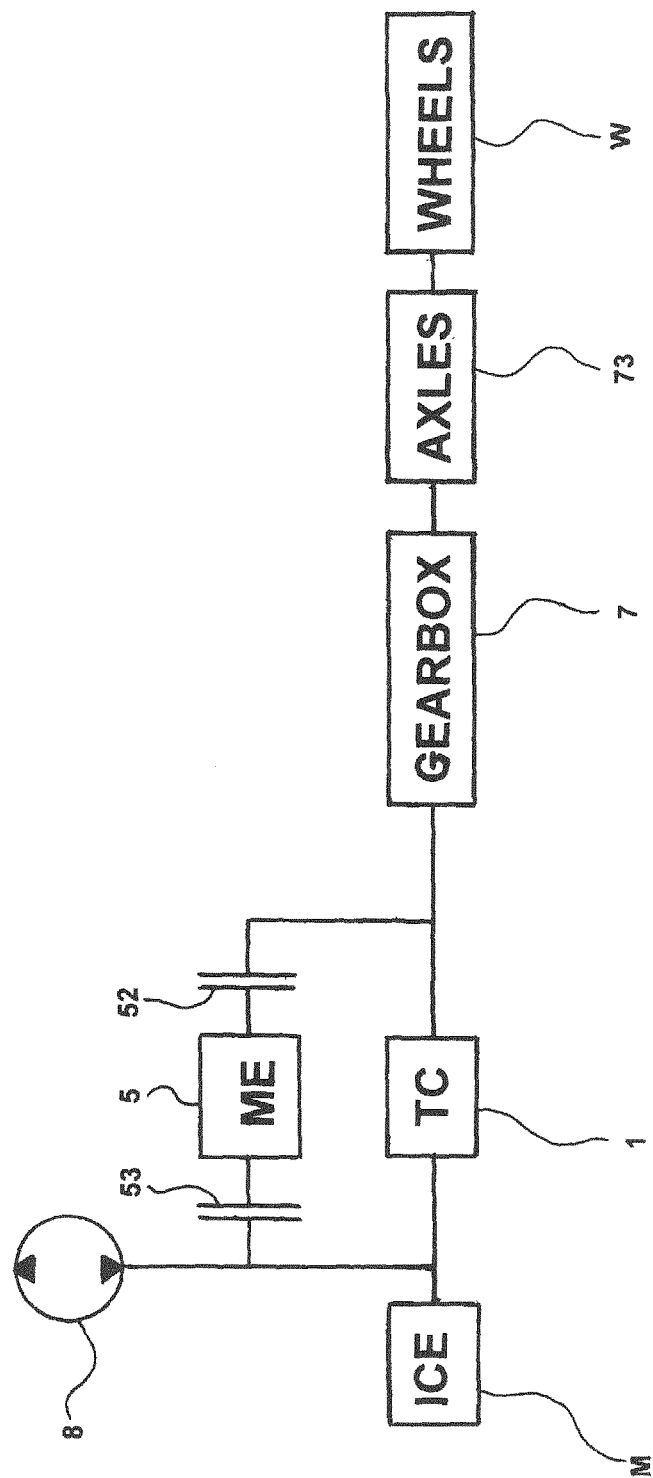
FIG. 2 is a functional diagram of the transmission system of FIG. 1.

The transmission system 100 comprises a torque converter 1, of known type, which is connected to a drive shaft, which is not illustrated in the Figures, in the region of an input 11. The drive shaft receives a rotational movement from a non-reversible endothermic motor M, for example, of the internal combustion type, which is schematically illustrated in FIG. 2.

Still with reference to FIG. 1, the torque converter comprises a frame which is illustrated purely in a schematic manner in the Figure and which defines a chamber of toroidal form in which there is received a centrifugal pump P which is also fixedly joined to the input 11 and the drive shaft in such a manner as to act on an operating fluid which is present inside the converter 1 itself.

The converter 1 further comprises a turbine T to which the operating fluid yields energy so as to rotate an output 12 of the converter which is fixedly joined to the turbine.

There is further provided, in a state interposed between the pump P and the turbine T, a stator element S which allows the production of a connection of the fluid-dynamic type between the drive shaft and the output of the torque converter 1. In any case, the operating methods of the torque converter 1 are known to a person skilled in the art and consequently will not be described in greater detail.

The transmission system according to the present invention comprises two separate output shafts from the torque converter 1: a first shaft 2 which is connected to the output 12 of the converter 1 and which is fixedly joined to the turbine, and a second output shaft 3 which is instead connected to the input 11 of the converter 1 and is consequently fixedly joined to the frame itself and schematically illustrated in the Figures by means of a broken line.

More specifically, the first shaft 2 is of tubular form in such a manner that there is defined a recess inside which there may extend the second shaft 3 which is coaxial therewith. The two output shafts will therefore also be defined below to be an internal shaft and external shaft, respectively.

The internal shaft 3 extends from the converter 1, to which it is rigidly connected, as far as an output end 31, in the region of which an output of the transmission system is provided for the connection to a service pump 8 or to other means for actuating the operating components of the vehicle, that is to say, the ones which are not involved in the movement operations. In this manner, the motor of the vehicle may supply power to the service users of the vehicle bypassing the converter 1 and consequently preventing the phenomena of dissipation associated with that component.

There is further fitted to the external shaft 2 a main coupling member 4 which is preferably constructed by means of a series of clutches which allow connection in a selective manner of the movement of the external shaft 2, and therefore the movement generated by the torque converter, to a gearbox 7 which is connected to the drive wheels W, the wheels only being illustrated schematically in the Figures. According to a preferred embodiment, the gearbox 7 has gears which are arranged on three different shafts, the primary shaft 71, secondary shaft 72 and output shaft 73, and selectively able to be coupled by means of a series of clutches or other coupling members 74 in order to obtain different transmission relationships.

Preferably, the transmission system according to the present invention also comprises an idle shaft 6 which can be connected to the external shaft 2 by means of the main coupling member 4 and which is in turn connected to the gearbox 7 which allows inversion of the movement of the wheels.

The internal shaft 3 further has a greater longitudinal extent with respect to the external shaft 2 in such a manner that, when the internal shaft is inserted in the first shaft, there remains defined an end which projects in an axial direction with respect to the external output shaft 2.

In the region of that end, there is provided a rotor element 51 of an electric motor 5 which can be selectively actuated as a motor and as an electrical generator and which is only illustrated schematically in the Figures.

In particular, the rotor element 51 is preferably coaxial with respect to the internal shaft 3 which extends completely through it.

The rotor element 51 can be connected, preferably at opposite ends, to the internal shaft and the external shaft, respectively. To that end, the transmission system according to the present invention comprises a second coupling member 52 and a third coupling member 53 which are preferably both constructed by means of clutches which are capable of selectively connecting the rotor element 51 to the external shaft 2 and/or the internal shaft 3, respectively. As can be seen in the Figure, the coupling member 52 is arranged downstream of the torque converter while the member 53 is upstream thereof. For that reason, the members 52 and 53 will also be indicated below as being the downstream member 52 and upstream member 53.

The presence of the coupling members 52 and 53 which are associated with the torque converter allows the electric motor 5 to operate as a power compensator:

when the upstream member 53 connects the rotor element 51 to the gearbox 7 and the electric motor 5 is actuated as a motor, the power of the electric motor 5 is added to that of the endothermic motor;

once the downstream member 52 is also closed, the blocking of the torque converter 1 is actuated, causing the pump and turbine to be fixedly joined to each other and eliminating the losses thereof;

under braking or deceleration conditions in general, the upstream member 53 is disconnected while the downstream member 52 remains connected, thereby causing the rotor 51 to be fixedly joined to the external shaft 2 and therefore successive in the kinematic chain with respect to the converter 1, thereby allowing better regenerative braking.

Therefore, it should be noted that the above-described configuration advantageously allows the rotor element of the electric motor to be used for blocking the converter, therefore making the transmission system according to the present invention particularly versatile.

This is also allowed by the fact that the rotor element 51 is provided in the region of an opposite distal end 25 of the external shaft 2 with respect to the torque converter 1, from which end the end of the internal shaft 3 extends.

Furthermore, in the transmission system according to the present invention the main coupling member 4 is provided in an intermediate position between the torque converter 1 and the distal end 25 and consequently the architecture of the transmission system is readily adaptable both in the case in which the electric motor 5 is present, therefore there is a hybrid configuration, and in the case in which it is replaced by another device for blocking the torque converter 1. Therefore, the same structure is also readily adaptable in order to be used in non-hybrid systems.

As may be noted in FIG. 2, the operation of the transmission system according to the present invention is brought about by placing in parallel the endothermic motor M and the electric motor 5 which, as a result of the coupling members 52 and 53, may be arranged in the kinematic chain of the transmission system alternately upstream or downstream of the converter 1.

Figure 3:
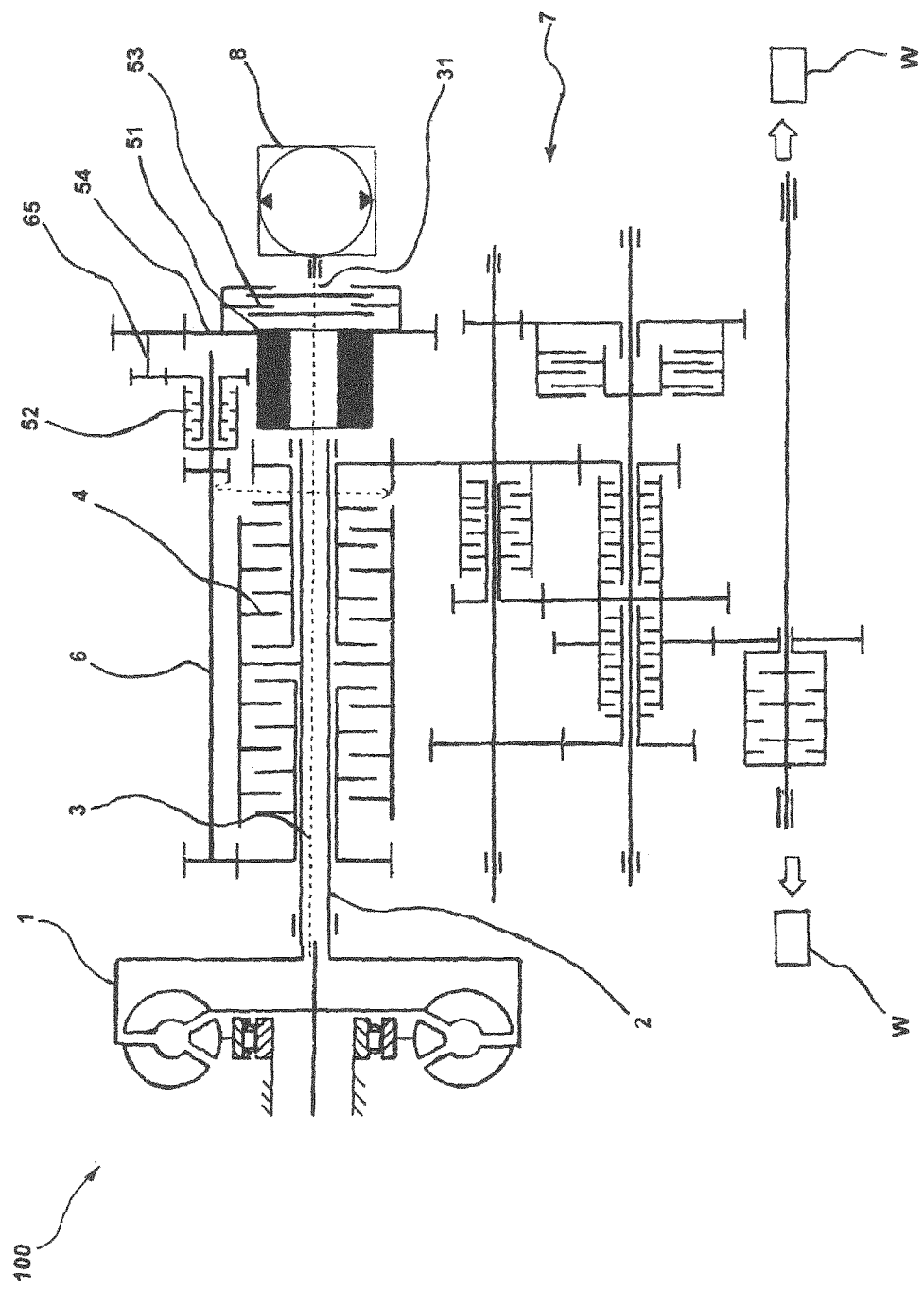
FIG. 3 is a schematic cross-section of a transmission system of the present invention according to an alternative embodiment.

Therefore, with reference to FIG. 3, in an alternative embodiment the transmission system according to the present invention comprises an additional idle shaft 65 which allows the converter to be blocked via the downstream clutch 52 which in this case is no longer axial with respect to the rotor 51 of the electric motor but is instead positioned on the idle shaft 6 for the inversion of the movement. Preferably, the additional idle shaft 65 receives the movement by means of a gear 54 which is fixedly joined to the rotor 51 in order to transmit the movement to the shaft 6.

By means of this solution, by closing the downstream clutch 52 it is possible to obtain complete regenerative braking with the main coupling member 4 and the upstream clutch 53 being opened, disconnecting the endothermic motor from the wheels and the electric motor.

This architecture, in addition to using the electric motor with a functionality as a starter for the endothermic motor, allows a purely electrical traction, obviously provided that it is within the limits of the power of the drive.

Figure 4:
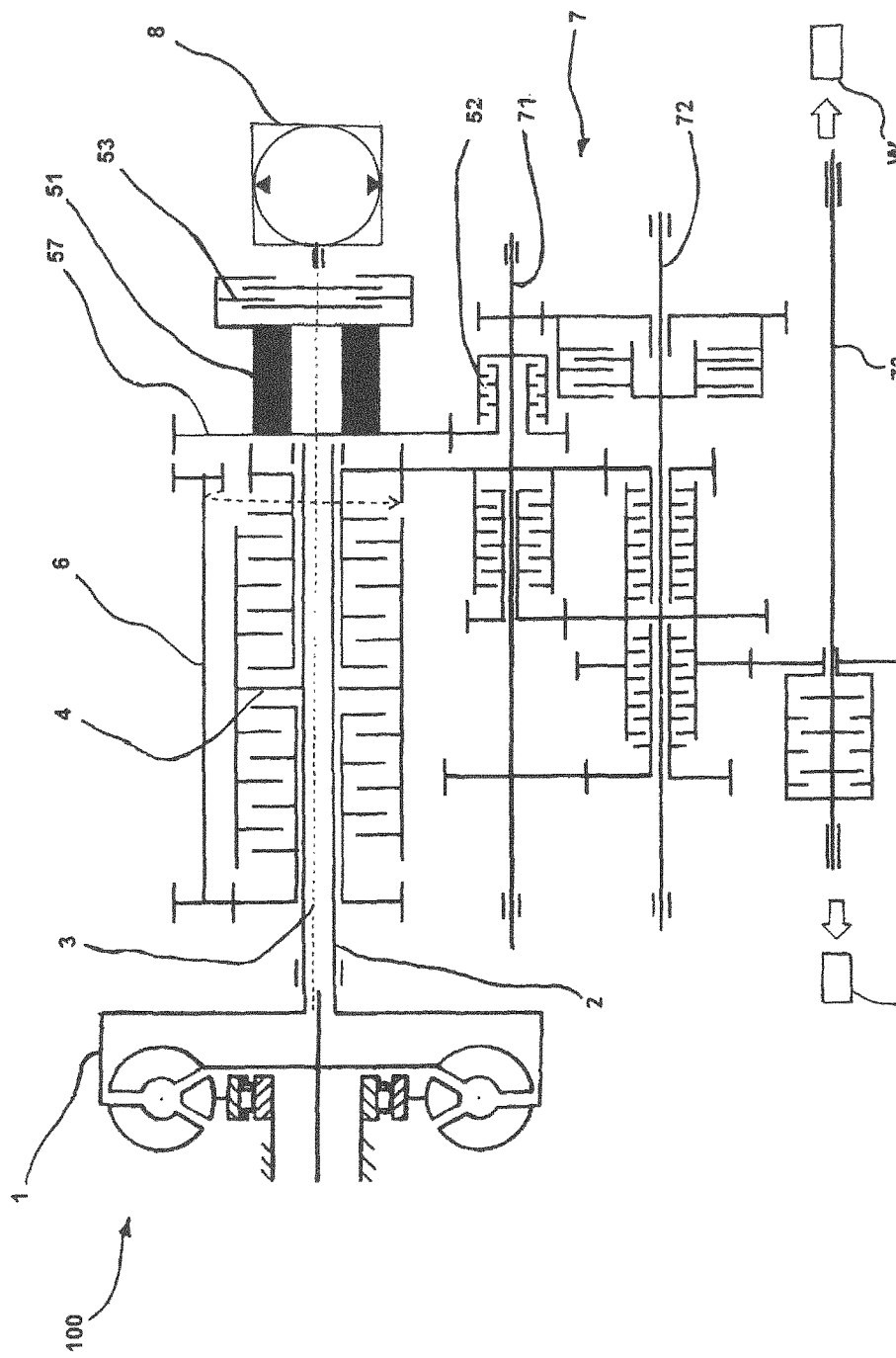
FIG. 4 is a schematic cross-section of a transmission system of the present invention according to another alternative embodiment.

Another construction variant is illustrated in FIG. 4.

In this embodiment, the blocking of the converter is not brought about coaxially with respect to the internal shaft 3 but instead in the region of the primary shaft 71 of the gearbox.

To that end, in the present embodiment, the downstream coupling member 52 is positioned on the primary shaft 71 which is connected to the rotor 51 by means of a gear 57.

With this solution, by closing the downstream clutch 52 it is also possible to obtain complete regenerative braking with the main coupling member 4 and the upstream coupling member 53 being opened, disconnecting the endothermic motor from the wheels and the electric motor, with the same advantages illustrated in relation to the preceding embodiment.

It is therefore evident that the transmission system described solves the problems identified with reference to the present invention as a result of the use of a pair of clutches which are arranged upstream and downstream of a torque converter which allow not only the operation of the transmission system to be switched between hybrid operation and conventional operation, but also the blocking of the torque converter to be produced.

That characteristic further allows an architecture which is readily adaptable both to hybrid solutions and to conventional solutions to be provided.

In fact, the module formed by upstream and downstream coupling members and an electric motor may be installed at the power take-off of the transmission positioned at the rear of the transmission allowing the design of the existing transmission not to be modified, allowing a system of hybrid/parallel traction to be constructed.

The invention claimed is:

1. A transmission system for hybrid propulsion vehicles, comprising:
   a. a torque convertor which includes:
      an input for connection to a drive shaft from which a pump of the torque convertor receives a rotational movement; and
      an output in fluid-dynamic connection with the input via a turbine of the torque convertor which is operated by the pump;
   b. an external output shaft of the torque convertor which is rigidly connected to the output of the torque convertor and an internal output shaft of the torque convertor which is rigidly connected to the input of the torque convertor, the external output shaft and the internal output shaft being coaxial with respect to each other;
   c. a gearbox which can be selectively connected to drive wheels of the vehicle;
   d. a main coupling member for selectively transmitting movement of the external shaft to the gearbox;
   e. an electric motor which can be selectively operated as a motor and as an electrical generator, the electric motor comprising a rotor element, and
   f. a downstream coupling member and an upstream coupling member which are arranged upstream and downstream of the torque convertor, respectively, and which are capable of selectively connecting the rotor element to the external shaft and the internal shaft, respectively, wherein the rotor element is arranged at an opposite distal end of the external shaft with respect to the torque convertor, the main coupling member being arranged in an intermediate position between the torque convertor and the distal end.

2. A transmission system for vehicles according to claim 1, wherein the downstream coupling member and the upstream coupling member are arranged at opposite ends of the rotor element.

3. A transmission system for vehicles according to claim 1, further comprising an idle shaft for inverting the movement transmitted to that gearbox, the downstream coupling member being positioned on the idle shaft, and comprising another idle shaft which is capable of transmitting movement of the rotor element to the downstream coupling member.

4. A transmission system for vehicles according to claim 1, wherein the gearbox comprises a main shaft which is capable of receiving the movement from the external shaft via the main coupling member, the downstream coupling member being positioned on the main shaft.

* * * * *